(12) United States Patent
Matsumura et al.

(10) Patent No.: US 11,920,021 B2
(45) Date of Patent: Mar. 5, 2024

(54) CELLULOSE ACETATE AND CELLULOSE ACETATE COMPOSITION

(71) Applicant: DAICEL CORPORATION, Osaka (JP)

(72) Inventors: Hiroyuki Matsumura, Tokyo (JP); Kyokutou Ga, Tokyo (JP); Masaaki Kusumoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/629,856

(22) PCT Filed: Dec. 9, 2019

(86) PCT No.: PCT/JP2019/048167
§ 371 (c)(1),
(2) Date: Jan. 25, 2022

(87) PCT Pub. No.: WO2021/117113
PCT Pub. Date: Jun. 17, 2021

(65) Prior Publication Data
US 2022/0267574 A1  Aug. 25, 2022

(51) Int. Cl.
C08L 1/12 (2006.01)
C08J 5/18 (2006.01)
C08K 3/22 (2006.01)

(52) U.S. Cl.
CPC . *C08L 1/12* (2013.01); *C08J 5/18* (2013.01); *C08K 3/22* (2013.01); *C08K 2003/222* (2013.01); *C08L 2201/06* (2013.01)

(58) Field of Classification Search
CPC ........................................................ C08L 1/12
See application file for complete search history.

(56) References Cited

U.S. PATENT DOCUMENTS

| | | | |
|---|---|---|---|
| 5,720,803 A | 2/1998 | Itoh et al. | |
| 2004/0024198 A1 | 2/2004 | Shibata et al. | |
| 2006/0142559 A1 | 6/2006 | Ozaki et al. | |
| 2009/0171079 A1* | 7/2009 | Higuchi | C08B 3/06 536/76 |
| 2012/0172585 A1 | 7/2012 | Shimamoto et al. | |
| 2015/0221411 A1* | 8/2015 | Nakamura | C08L 1/10 252/511 |
| 2019/0031860 A1 | 1/2019 | Moriyama et al. | |
| 2022/0142900 A1 | 5/2022 | Kobayashi et al. | |

FOREIGN PATENT DOCUMENTS

| | | |
|---|---|---|
| EP | 2075261 A1 | 7/2009 |
| EP | 2883906 A1 | 6/2015 |
| JP | 7-76632 A | 3/1995 |
| JP | 9-241425 A | 9/1997 |
| JP | 2002-30182 A | 1/2002 |
| JP | 2003-201301 A | 7/2003 |
| JP | 2009-19123 A | 1/2009 |
| JP | 2009-155555 A | 7/2009 |
| JP | 2018-500416 A | 1/2018 |
| JP | 2019-26700 A | 2/2019 |
| JP | 2019-44102 A | 3/2019 |
| WO | WO 02/072638 A1 | 9/2002 |
| WO | WO 2004/076490 A1 | 9/2004 |
| WO | WO 2011/093216 A1 | 8/2011 |
| WO | WO 2016/092024 A1 | 6/2016 |
| WO | WO 2019/156116 A1 | 8/2019 |

OTHER PUBLICATIONS

International Search Report, issued in PCT/JP2019/048167, PCT/ISA/210, dated Feb. 25, 2020.
Ishii et al., "Study on microflora of activated sludge and salt and drug resistance of isolated bacteria" Life Science, 1983, vol. 27, No. 3, p. 111-118.
Office Action issued in European Patent Application No. 19888249.0 dated Jul. 23, 2021.
Written Opinion of the International Searching Authority, issued in PCT/JP2019/048167, PCT/ISA/237, dated Feb. 25, 2020.
Office Action dated Apr. 5, 2022, in Japanese Patent Application No. 2021-563476.
Extended European Search Report for European Application No. 23168462.2, dated Sep. 7, 2023.

* cited by examiner

*Primary Examiner* — Arrie L Reuther
(74) *Attorney, Agent, or Firm* — Birch, Stewart, Kolasch & Birch, LLP

(57) ABSTRACT

An object of the present invention is to provide a cellulose acetate with excellent biodegradability in seawater.
A cellulose acetate having a total degree of acetyl substitution of not greater than 2.7, a ratio $\tau$ of a sum of a degree of acetyl substitution at the 2-position and a degree of acetyl substitution at the 3-position to a degree of acetyl substitution at the 6-position in the total degree of acetyl substitution of not less than 2.0, and a sulfate component amount of greater than 20 ppm and not greater than 400 ppm.

5 Claims, No Drawings

CELLULOSE ACETATE AND CELLULOSE ACETATE COMPOSITION

TECHNICAL FIELD

The present invention relates to a cellulose acetate and a cellulose acetate composition.

BACKGROUND ART

In recent years, various researches have been done on biodegradable resins, which can be easily degraded in an environment, such as compost, rivers, seas, and soil. Examples of representative biodegradable resins include cellulose acetate. Cellulose acetate is advantageous in that it can be obtained from natural materials, such as wood and cotton, without conflicting with food or feed resources.

Non-Patent Literature 1 describes examinations of viable counts and identified bacterial flora of separated bacteria in PM media under freshwater conditions of 0.5% (0.08 M) NaCl and seawater conditions of 3% (0.5 M) NaCl. In addition, Non-Patent Document 1 describes a result that the viable counts were $2.6 \times 10^7$ cells/mL under the freshwater conditions and $9.7 \times 10^5$ cells/mL in the seawater conditions, which was 3.7% of the viable count under the freshwater conditions.

Patent Document 1 describes "it was found that a polymer composition containing at least one basic additive, a 1 wt. % aqueous solution at 20° C. with the at least one basic additive having a pH of not higher than 13 and not lower than 7, exhibits more improved biodegradability than a composition not containing the at least one additive" and discloses a cellulose acetate as the polymer.

Patent Document 2 describes the following. For a cellulose acetate optical film exhibiting optical properties as a result of stretching, a cellulose acetate that has excellent stretchability and excellent optical properties as a result of stretching is provided. A cellulose diacetate for retardation films is provided, the cellulose diacetate having a total degree of acetyl substitution of 2.27 to 2.56, a polydispersity Mw/Mn of greater than 3.0 and not less than 7.5, and a degree of substitution at a 6-position of 0.65 to 0.85, and a half-height width of a degree of acetylation distribution of 1.0 to 2.3, and a viscosity-average degree of polymerization of not less than 182 and not greater than 213. The cellulose diacetate for retardation films according to this disclosure has a 6-percent viscosity of preferably 120 to 230 mPa·s and a weight average molecular weight Mw of preferably not less than 205000 and not greater than 235000.

CITATION LIST

Patent Document

Patent Document 1: WO 2016/092024
Patent Document 2: WO 2011/093216

Non-Patent Literature

Non-Patent Literature 1: Eiji Ishii et al.; Life Science, 1983, Vol. 27, No. 3, p. 111-118

SUMMARY OF INVENTION

Technical Problem

However, cellulose acetates known in the art are not sufficiently degradable in seawater. This is because, as can be seen from Non-Patent Literature 1, seawater contains fewer fungi (true fungi) and bacteria (germs) compared with soil and freshwater, such as river water, and in this environment, it is difficult for the cellulose acetate to undergo biodegradation. That is, bacteria, fungi, and the like contributing to biodegradation are not present in abundance, resulting in difficulty in biodegradation in seawater.

An object of the present invention is to provide a cellulose acetate with excellent biodegradability in seawater.

Solution to Problem

A first aspect of the present disclosure relates to a cellulose acetate having a total degree of acetyl substitution of not greater than 2.7, a ratio τ of a sum of a degree of acetyl substitution at a 2-position and a degree of acetyl substitution at a 3-position to a degree of acetyl substitution at a 6-position in the total degree of acetyl substitution of not less than 2.0, and a content of a sulfate component of greater than 20 ppm and not greater than 400 ppm.

In the cellulose acetate, the content of the sulfate component is preferably not less than 80 ppm and not greater than 380 ppm.

In the cellulose acetate, the content of the sulfate component is preferably not less than 150 ppm and not greater than 350 pm.

In the cellulose acetate, the ratio τ of the sum of the degree of acetyl substitution at the 2-position and the degree of acetyl substitution at the 3-position to the degree of acetyl substitution at the 6-position in the total degree of acetyl substitution is preferably not greater than 2.5.

A second of the present disclosure relates to a cellulose acetate composition containing a cellulose acetate and an additive; the cellulose acetate having a total degree of acetyl substitution of not greater than 2.7 and a ratio of a sum of a degree of acetyl substitution at a 2-position and a degree of acetyl substitution at a 3-position to a degree of acetyl substitution at a 6-position in the total degree of acetyl substitution of not less than 2.0; and the additive being one or more selected from the group consisting of a material with a pH of not lower than 8 in a 1 wt. % aqueous solution at 20° C., a material dissolving in water at 20° C. in not less than 2 wt. %, and a material with excellent biodegradability in a sea.

In the cellulose acetate composition, a content of a sulfate component in the cellulose acetate is preferably greater than 20 ppm and not greater than 400 ppm.

In the cellulose acetate composition, a content of the additive is preferably from 5 to 40 wt. %.

In the cellulose acetate composition, the material with a pH not lower than 8 in a 1 wt. % aqueous solution at 20° C. is preferably magnesium oxide.

In the cellulose acetate composition, the material dissolving at not less than 2 wt. % in water at 20° C. is preferably triacetin.

In the cellulose acetate composition, a slurry formed by mixing the cellulose acetate composition with water preferably has a pH of 7 to 13 at 20° C.

Advantageous Effects of Invention

The present invention can provide the cellulose acetate with excellent biodegradability in seawater.

DESCRIPTION OF EMBODIMENTS

Cellulose Acetate

A cellulose acetate in the present disclosure has a total degree of acetyl substitution of not greater than 2.7, a ratio τ of a sum of a degree of acetyl substitution at a 2-position and a degree of acetyl substitution at a 3-position to a degree of acetyl substitution at a 6-position in the total degree of acetyl substitution of not less than 2.0, and a content of a sulfate component of greater than 20 ppm and not greater than 400 ppm.

The cellulose acetate has a total degree of acetyl substitution of not greater than 2.7, preferably not greater than 2.6, more preferably not greater than 2.5, and even more preferably not greater than 2.2. The total degree of acetyl substitution may be not less than 0.1 and is preferably not less than 1.8. The cellulose acetate with the total degree of acetyl substitution greater than the above values would have poor biodegradability in seawater, and the cellulose acetate with the total degree of acetyl substitution less than the above values would have poor formability.

The total degree of acetyl substitution is a sum of each degree of acetyl substitution at the 2-, 3-, and 6-positions of the glucose ring of the cellulose acetate as measured below.

Each degree of acetyl substitution at the 2-, 3-, and 6-positions of the glucose ring of the cellulose acetate can be measured according to the method of Tezuka (Tezuka, Carbonydr. Res. 273, 83 (1995)) by NMR. That is, the free hydroxyl group of the cellulose acetate sample is propionylated with propionic anhydride in pyridine. The resulting sample is dissolved in deuterated chloroform ($CDCl_3$) and the $^{13}C$-NMR spectrum is measured. The carbon signals of the acetyl group appear in the region from 169 ppm to 171 ppm in the order of the 2-, 3-, and 6-positions from the higher magnetic field; and the carbonyl carbon signals of the propionyl group appear in the region from 172 ppm to 174 ppm in the same order. Each degree of acetyl substitution at the 2-, 3-, and 6-positions of the glucose ring in the original cellulose acetate can be determined from the presence ratio of the acetyl group and the propionyl group at respective positions (in other words, the area ratio of each signal). The degree of acetyl substitution can be analyzed by $^{1}H$-NMR in addition to $^{13}C$-NMR.

In the total degree of acetyl substitution, the ratio τ of the sum of the degree of acetyl substitution at the 2-position and the degree of acetyl substitution at the 3-position to the degree of acetyl substitution at the 6-position is not greater than 2.0, and the value of τ may be not less than 2.1, not less than 2.2, or not less than 2.3. The upper limit is not particularly limited but may be not greater than 2.5. The cellulose acetate with the value of τ less than 2.0 would have poor biodegradability in seawater.

The cellulose acetate in the present disclosure has a content of a sulfate component of greater than 20 ppm and not greater than 400 ppm. The content of the sulfate component is preferably not less than 50 ppm and not greater than 380 ppm, more preferably not less than 80 ppm and not greater than 380 ppm, even more preferably not less than 100 ppm and not greater than 350 ppm, and particularly preferably not less than 150 ppm and not greater than 350 ppm. The cellulose acetate having the sulfate component in the above range has superior biodegradability in seawater. The greater the sulfate component content, the higher the biodegradability in seawater the cellulose acetate has. In addition, the cellulose acetate having an excess sulfate component content would be difficult to produce.

The sulfate component content is the content calculated in terms of $SO_4^{2-}$ of sulfurous acid gas sublimated from the dried cellulose acetate.

Cellulose Acetate Composition

A cellulose acetate composition in the present disclosure may contain an optional component in addition to the cellulose acetate. Examples of the optional component of the cellulose acetate composition include additives and materials that is highly safe in the marine environment.

Examples of the additive include one or more additives selected from the group consisting of a material with a pH of not lower than 8 in a 1 wt. % aqueous solution at 20° C., a material dissolving in water at 20° C. in not less than 2 wt. %, and a material with excellent biodegradability in the sea.

The composition containing the cellulose acetate in the present disclosure is preferably the following cellulose acetate: a cellulose acetate composition containing a cellulose acetate and an additive; the cellulose acetate with a total degree of acetyl substitution of not greater than 2.7 and a ratio τ of a sum of a degree of acetyl substitution at the 2-position and a degree of acetyl substitution at the 3-position to a degree of acetyl substitution at the 6-position in the total degree of acetyl substitution of not less than 2.0; and the additive being one or more selected from the group consisting of a material with a pH of not lower than 8 in a 1 wt. % aqueous solution at 20° C., a material dissolving at not less than 2 wt. % in water at 20° C., and a material with excellent biodegradability in the sea.

Material with pH Not Lower Than 8 in 1 wt. % Aqueous Solution at 20° C.

The material with a pH of not lower than 8 in a 1 wt. % aqueous solution at 20° C. can be also referred to as a basic additive. The basic additive has a pH of preferably not lower than 8.5 and more preferably from 8.5 to 11 in a 1 wt. % aqueous solution at 20° C.

The pH of the 1 wt. % aqueous solution at 20° C. is measured according to a standard procedure, for example, with a glass pH electrode.

In the present disclosure, the "1 wt. % aqueous solution at 20° C." does not require that all the solute be dissolved in water. An aqueous solution typically refers to a liquid in which a solute is dissolved in water ($H_2O$), that is, a solution in which the solvent is water. The water molecule is a polar molecule, and thus the material to be the solute in the aqueous solution is believed to be an ionic crystal or a polar molecular material. However, in the present disclosure, the "aqueous solution" includes a suspension. That is, the aqueous solution includes a slurry and a colloidal solution, which are disperse systems in which solid particles are dispersed in a liquid. In addition, the "1 wt. % aqueous solution at 20° C." in the present disclosure includes those in which a portion of the basic additive dissolves and forms an aqueous solution, and a remaining portion of the basic additive may form a suspension, when 1 wt. % of the basic additive is added to water.

The solid particles may be colloidal particles (not greater than approximately 100 nm) but may be particles larger than colloidal particles. A suspension of colloidal particles is referred to as a colloidal solution, and a suspension of particles larger than colloidal particles may be referred to simply as suspension. A suspension of particles larger than the colloidal particles, unlike a colloidal solution, settles to a steady state over time. The solid particles larger than colloidal particles can be visible under a microscope and may subside over time when placed in a quiet location.

When the basic additive in the aqueous solution is an inorganic substance that is ionized in the aqueous solution, the surface of the inorganic substance adsorbs and charges ions by the effect of the surface charge of the particles and affects the ion distribution in the vicinity of the surface. This effect causes a distribution of ions around the surface of the basic additive called an electric double layer, the distribution different from that in the solution (solvent) outside the vicinity of the particle interface. The electric double layer is formed of a fixed layer in which ions are strongly adsorbed on the particle surface and a diffusion layer that exists away from the fixed layer. Also when the basic additive of the present disclosure is not dissolved in water, the pH of the dispersion medium changes because of the surface charge of the basic additive as described above.

Examples of the material with a pH of not lower than 8 in a 1 wt. % aqueous solution at 20° C. (the basic additive) include oxides, hydroxides, carbonates, acetates, ammonium salts, aluminates, silicates, or metasilicates of alkaline earth metals or alkali metals; ZnO; and basic $Al_2O_3$.

The basic additive is preferably one or more selected from the group consisting of oxides, hydroxides, carbonates, ammonium salts, aluminates, silicates, or metasilicates of alkaline earth metals or alkali metals; ZnO; and basic $Al_2O_3$.

The basic additive is more preferably one or more selected from the group consisting of oxides, hydroxides, aluminates, silicates, or metasilicates of alkaline earth metals or alkali metals; ZnO; and basic $Al_2O_3$.

The basic additive is even more preferably one or more selected from the group consisting of oxides, aluminates, silicates, or metasilicates of alkaline earth metals or alkali metals; ZnO; and basic $Al_2O_3$.

The basic additive is still more preferably one or more selected from the group consisting of oxides, aluminates, silicates, and metasilicates of alkaline earth metals or alkali metals.

The basic additive is particularly preferably an oxide of an alkaline earth metal. Magnesium oxide (MgO) is one of the most preferred basic additives.

Examples of the oxides of alkaline earth metals or alkali metals include magnesium oxide (MgO) and calcium oxide (CaO).

Examples of the hydroxides of alkaline earth metals or alkali metals include $Mg(OH)_2$ and $Ca(OH)_2$.

Examples of the carbonates of alkaline earth metals or alkali metals include $MgCO_3$, $CaCO_3$, $NaHCO_3$, $Na_2CO_3$, and $K_2CO_3$.

Examples of the acetates of alkaline earth metals or alkali metals include magnesium acetate and calcium acetate.

Examples of the aluminates of alkaline earth metals or alkali metals include sodium aluminate. Sodium aluminate is an inorganic compound containing sodium and aluminum. Examples of the compound called sodium aluminate include sodium aluminum dioxide ($NaAlO_2$), which is a double oxide, and sodium tetrahydroxide aluminate ($Na[Al(OH)_4]$), which is a hydroxy complex.

Examples of the silicates of alkaline earth metals or alkali metals include sodium silicate ($Na_2SiO_3$). Silicic acid is a generic term for compounds of silicon, oxygen, and hydrogen represented by the general formula $[SiO_x(OH)_{4-2x}]_n$.

Examples of the metasilicates of alkaline earth metals or alkali metals include magnesium aluminometasilicate, which is represented by the general formula $Al_2O_3 \cdot MgO \cdot 2SiO_2 \cdot xH_2O$, where x represents the number of crystal water and $1 \leq x \leq 10$. Magnesium aluminometasilicate itself is well known, and a commercially available product can also be used. For example, magnesium aluminometasilicate of the Japanese Pharmaceutical Codex can be suitably used. Magnesium metasilicate aluminate is marketed under the trade designation of Neusilin (trade name) as an antacid.

Examples of other preferred basic materials include basic polymers and oligomers; basic amino acids and proteins; and basic sugars.

The basic additive of the present disclosure need not necessarily be water soluble but may have a solubility of $10^{-5}$ to 70 g/100 mL of water at 20° C. The basic additive of the present disclosure preferably has a solubility of not less than $10^{-6}$ g/100 mL of water at 20° C., more preferably has a solubility of not less than $10^{-5}$ g/100 mL of water at 20° C., and even more preferably has a solubility of not less than $10^{-4}$ g/100 mL of water at 20° C. In addition, the basic additive preferably has a solubility of not greater than 10 g/100 mL of water at 20° C., more preferably has a solubility of not greater than 1 g/100 mL of water at 20° C., and even more preferably has a solubility of not greater than 0.1 g/100 mL of water at 20° C.

Examples of the additive having a solubility of about $10^{-4}$ g/100 mL (20° C.) in water are MgO, ZnO, and $Mg(OH)_2$. An example of the additive having a solubility of about $10^{-2}$ g/100 mL (20° C.) in water is $MgCO_3$. Examples of the additive having a solubility of about 0.1 g/100 mL (20° C.) in water are CaO and $Ca(OH)_2$.

Material Dissolving at Not Less Than 2 wt. % in Water at 20° C.

The material dissolving at not less than 2 wt. % in water at 20° C. may be a polymer or low molecular weight material that is water soluble.

Examples of the polymer material may include a hydrophilic polymer. Here, the hydrophilic polymer is a polymer having a hydrophilic functional group. The hydrophilic polymer is not particularly limited, and examples of the hydrophilic polymer include polymers having an OH group, such as polyvinyl alcohol and partially saponified polyvinyl acetate; polymers having a COOH group, such as polyacrylate, polymethacrylic acid, and copolymers of acrylic acid or methacrylic acid with other monomers; polymers having a polyether backbone, such as polyethylene glycol, 1,3-polypropylene glycol, and 1,4-polybutylene glycol; and polymers having a monomer in the composition, the monomer having an amide backbone in a molecule, such as polyvinylpyrrolidone, polyacrylamide, poly-N-methylacrylamide, poly-N,N-dimethylacrylamide, polyacryloylmorpholine, poly-N-vinylmorpholine, and poly-N-vinylmorpholine-N-oxide. One of the hydrophilic polymers may be used alone, or two or more of the hydrophilic polymers may be used in combination.

The polymer material is a polymer having a repeating unit, and when the number of atoms constituting the repeating unit is N2, and the total number of an OH group, an amide group, an amino group, a COOH group, and an $NR_3^+$ group contained in the repeating unit is N1, N1/N2 is preferably not less than 0.01 and not greater than 0.55 and more preferably not less than 0.1 and not greater than 0.5. This is because high hydrophilicity can be imparted. Examples of the R of the $NR_3^+$ group include $CH_3$ and $CH_2CH_3$.

The polymer material is preferably an amide group-containing vinyl polymer. The amide group-containing vinyl polymer is obtained by polymerization of a vinyl monomer having an amide group. The amide group-containing vinyl polymer is more preferably polyvinylpyrrolidone or a vinylpyrrolidone copolymer. This is due to excellent compatibility with the cellulose acetate.

Examples of the low molecular weight material include polysaccharides and plasticizers for cellulose acetate.

Examples of the polysaccharides include polysaccharides composed of: at least one polysaccharide (A) selected from oligosaccharide (powdered oligosaccharide), reduced starch syrup, and cluster dextrin; and a sugar alcohol (B) of this at least one polysaccharide, the sugar alcohol having crystallinity.

As the at least one polysaccharide selected from oligosaccharide (powdered oligosaccharide), reduced starch syrup, and cluster dextrin, the following can be used.

The oligosaccharide (A1) may be a homo-oligosaccharide or a hetero-oligosaccharide. Examples of the oligosaccharide (A1) include oligosaccharides of disaccharides to decasaccharides and disaccharides to hexasaccharides. The oligosaccharide (A1) may be an anhydride. In addition, in the oligosaccharide (A1), a monosaccharide and a sugar alcohol may be bonded. Furthermore, the oligosaccharide (A1) may be an oligosaccharide composition composed of a plurality of saccharide components and may be an oligosaccharide composition produced by decomposition of a polysaccharide. Such an oligosaccharide composition may be also referred to simply as the oligosaccharide (A1).

The oligosaccharide (A1) is typically solid at ordinary temperature. The oligosaccharide (A1) (or the oligosaccharide composition) can be used alone, or two or more of the oligosaccharides (A1) (or the oligosaccharide compositions) can be used in combination. The oligosaccharide (A1) is typically derived from a natural product and thus can reduce the load on the environment.

Examples of the disaccharides include homo-oligosaccharides, such as trehalose, maltose, isomaltose, cellobiose, gentiobiose, and melibiose; and hetero-oligosaccharides, such as lactose, sucrose, and palatinose.

Examples of the trisaccharides include homo-oligosaccharides, such as maltotriose, isomaltotriose, panose, and cellotriose; and hetero-oligosaccharides, such as manninotriose, solatriose, melezitose, planteose, gentianose, umbelliferose, lactosucrose, and raffinose.

Examples of the tetrasaccharides include homo-oligosaccharides, such as maltotetraose and isomaltotetraose; and hetero-oligosaccharides, such as a tetraose in which a sugar or a sugar alcohol is attached to the reducing end of stachyose, cellotetraose, scorodose, liquinose, or panose. Among these tetrasaccharides, the tetraose in which a monosaccharide or a sugar alcohol is attached to the reducing end of panose is disclosed, for example, in JP 10-215892 A and can be exemplified by a tetraose in which a monosaccharide, such as glucose, fructose, mannose, xylose, or arabinose; or a sugar alcohol, such as sorbitol, xylitol, or erythritol, is attached to the reducing end of panose.

Examples of the pentasaccharides include homo-oligosaccharides, such as maltopentaose and isomaltopentaose; and hetero-oligosaccharides, such as a pentaose in which a disaccharide is attached to the reducing end of panose. The pentaose in which a disaccharide is attached to the reducing end of panose is disclosed, for example, in JP 10-215892 A and can be exemplified by a pentaose in which a disaccharide, such as sucrose, lactose, cellobiose, or trehalose, is attached to the reducing end of panose.

Examples of the hexasaccharides include homo-oligosaccharides, such as maltohexaose and isomaltohexaose.

Among these oligosaccharides (or oligosaccharide compositions), at least oligosaccharides composed of a tetrasaccharide are preferred in terms of melt viscosity properties and melt mixing or kneadability with a resin component.

Examples of such oligosaccharides or oligosaccharide compositions include starch sugars (starch saccharification products), galactooligosaccharides, coupling sugars, fructooligosaccharides, xylooligosaccharides, soybean oligosaccharides, chitin oligosaccharides, and chitosan oligosaccharides, and these components can be used alone or in combination of two or more. For example, the starch sugar is an oligosaccharide composition formed by allowing an acid, glucoamylase, or the like to act on the starch and may be a mixture of oligosaccharides in which a plurality of glucoses is bonded.

Examples of the starch sugar include a reduced starch saccharification product available from Towa Chemical Industry Co., Ltd. (trade designation: PO-10, tetrasaccharide content of not less than 90 wt. %). The galactooligosaccharide is an oligosaccharide composition formed by allowing β-galactosidase or the like to act on lactose and may be a mixture of galactosyl lactose and galactose-(glucose)$_n$, where n is an integer of 1 to 4. The coupling sugar is an oligosaccharide composition formed by allowing cyclodextrin synthetase (CGTase) to act on starch and sucrose and may be a mixture of (glucose)$_n$-sucrose, where n is an integer of 1 to 4. The fructooligosaccharide is an oligosaccharide composition formed by allowing fructofuranosidase act on sugar and may be a mixture of sucrose-(fructose)$_n$, where n is an integer of 1 to 4.

The material dissolving at not less than 2 wt. % in water at 20° C. described above preferably contains a plasticizer for cellulose acetate.

Plasticizer for Cellulose Acetate

For plasticizers, details are exemplified in "Handbook of Plasticizers," Ed. Wypych, George, ChemTec Publishing (2004). Examples of the plasticizer include dimethyl phthalate; diethyl phthalate; dibutyl phthalate; dioctyl phthalate; diisononyl phthalate; butyl benzyl phthalate; butyl phthalyl butyl glycolate; tris(2-ethylhexyl)trimellitate; triethyl phosphate, triphenyl phosphate, tricresyl phosphate, p-phenylene bis(diphenyl phosphate), and other phosphate derivatives; diisobutyl adipate; bis(2-ethylhexyl)adipate; triethyl citrate; acetyl triethyl citrate; plasticizers containing citric acid (e.g., Citroflesx (trade name); monoacetin; diacetin; triacetin; tripropionin; tributyrin; sucrose acetate isobutyrate; glucose pentapropionate; triethylene glycol-2-ethylhexanoate; polyethylene glycol; polypropylene glycol; polypropylene glycol dibenzoate; polyethylene glutarate; polyethylene succinate; poly alkyl glycoside; 2,2,4-trimethyl-1,3-pentanediol isobutyrate; diisobutyrate; phthalate copolymers; 1,3-butanediol; aliphatic epoxide-terminated 1,4-butanediol; bis(2-ethylhexyl)adipate; epoxidized soybean oil; and mixtures of these compounds.

In addition, as the plasticizer, a glycerin ester plasticizer can be used. As the glycerin ester plasticizer, a lower fatty acid ester of glycerin, in other words, an ester compound of glycerin and a fatty acid having from 2 to 4 carbons can be used. A fatty acid having 2 carbons is acetic acid, a fatty acid having 3 carbons is propionic acid, and a fatty acid having 4 carbons is butyl acid. The glycerin ester plasticizer may be an ester in which all three hydroxyl groups of glycerin are esterified with the same fatty acids, an ester in which two hydroxyl groups are esterified with the same fatty acids, or an ester in which all three hydroxyl groups of glycerin are esterified with different fatty acids.

Glycerin ester plasticizers are non-toxic and easily biodegraded, and thus have a small environmental load. In addition, the addition of the glycerin ester plasticizer to the cellulose acetate can lower the glass transition temperature of the resulting cellulose acetate composition. Thus, this can also impart excellent thermoformability to the raw material.

When the fatty acid is acetic acid, examples of the glycerin ester plasticizer include triacetin, in which three hydroxyl groups of glycerin are esterified with acetic acid, and diacetin, in which two hydroxyl groups are esterified with acetic acid.

Among the glycerin ester plasticizers described above, triacetin (glycerol trisacetate), in which all three hydroxyl groups of glycerin are esterified with acetic acid (in other words, acetylated), is preferred. Triacetin is a component recognized as safe for human intake and is easily biodegraded, and thus has a small environmental load. In addition, the cellulose acetate composition formed by adding triacetin to the cellulose acetate has improved biodegradability over the cellulose acetate used alone. Furthermore, the addition of triacetin to the cellulose acetate can efficiently lower the glass transition temperature of the cellulose acetate. Thus, this can impart excellent thermoformability to the raw material.

Triacetin is preferably pure in terms of chemical structure and high in purity. In addition, for example, a plasticizer containing not less than 80 wt. % or not less than 90 wt. % of triacetin and the remaining weight percentage of mono-acetin and/or diacetin may be used.

Material with Excellent Biodegradability in Sea

The addition of a material with excellent biodegradability in the sea can promote biodegradability of the cellulose acetate. Examples of the material with excellent biodegradability in the sea include compounds with excellent biodegradability in the sea. The material with excellent biodegradability in the sea may be insoluble in water. Examples of the compounds with excellent biodegradability in the sea include materials that undergoes degradation by not less than 50%, preferably not less than 70%, and even more preferably not less than 90% relative to the cellulose for comparison, after a duration of 180 days by a method specified in ASTM D6691. Examples of such compounds include poly[hydroxybutyrate-co-hydroxyhexanoate] (PHBH), polyhydroxyalkanoates, such as polyhydroxybutyrate, and thermoplastic starch resins (including acetylated starch).

The process of biodegradation of the cellulose acetate and cellulose acetate compositions of the present disclosure is as follows. The mechanism of biodegradation of cellulose acetate is commonly believed to be that once each acetyl group of cellulose acetate is hydrolyzed, the resulting cellulose acetate with a reduced degree of substitution undergoes degradation by an action of a cellulose-degrading enzyme (e.g., β-glucosidase; EC 3.2.1.21) or the like. β-glucosidase (EC 3.2.1.21) is an enzyme catalyzing the hydrolysis of (β-glycosidic linkage in sugars and is also called β-D-glucoside glucohydrolase and amygdase. The β-glycosidic linkage constituting the polymer chain of cellulose acetate is hydrolyzed, and the resulting monosaccharides and low molecular weight polysaccharides then undergo degradation by metabolism of common microorganisms. Thus, to promote biodegradability, promoting the elimination of acetyl groups is effective.

The ocean is weakly basic, and this basicity also leads to deacetylation of cellulose acetate. As a result of the study, it was found that deacetylation (hydrolysis) under basic conditions is faster at the 2- and 3-positions in the glucose ring than at the 6-position. Thus, for example, for cellulose acetates with the same total degree of substitution, it was found that a cellulose acetate with higher degree of substitution at the 2- and 3-positions than at the 6-position results in faster rate of decrease in the total degree of substitution and leading to faster biodegradation. In addition, it was found that the cellulose acetate containing greater than 20 ppm and 400 pp of the sulfate component has excellent biodegradability. The cellulose acetate with an excess sulfate component would degrade during use as a product before immersed in the sea. These effects are considered to exhibit the same tendency in any total degree of substitution, when compared among the cellulose acetates having the same total degree of substitution. However, the cellulose acetate with a total degree of acetyl substitution of not greater than 2.7 has an excellent level of biodegradability.

The ratio τ of the sum of the degree of acetyl substitution at the 2-position and the degree of acetyl substitution at the 3-position to the degree of acetyl substitution at the 6-position in the total degree of acetyl substitution is not greater than 2.0, in particular, preferably not less than 2.1, and furthermore, preferably not less than 2.15, and not less than 2.2.

The degradation mechanism of the cellulose acetate composition of the present disclosure is as follows. Although this mechanism is a speculation, a material (basic additive) with a pH of not lower than 8 in a 1 wt. % aqueous solution at 20° C. is considered to promote hydrolysis (deacetyl) of the cellulose acetate in weakly basic seawater. This deacetylation effect with the basic material is remarkable in the cellulose acetate having more acetyl groups at the 2- and 3-positions than at the 6-position, and further in the cellulose acetate having more sulfate components. It is thought that this results in reduced degree of substitution of the cellulose acetate constituting the cellulose acetate composition, and this can contribute to the improved biodegradability. The cellulose acetate composition preferably does not exhibit these properties during use as a product and exhibits these properties immediately upon contact with seawater. Thus, the basic material is preferably dispersed as solid particles in the cellulose acetate composition, and preferably has a particle size as fine as possible and a large specific surface area.

As the material with a pH of not lower than 8 in a 1 wt. % aqueous solution at 20° C. (basic additive), magnesium aluminometasilicate, magnesium oxide, and the like can be preferably used because of their high safety, such as being used as pharmaceuticals.

In addition, the cellulose acetate composition of the present disclosure can contain a material dissolving at not less than 2 wt. % in water at 20° C. Such a material can dissolve in seawater when the cellulose acetate composition is put into seawater. Then, the material comes out of the cellulose acetate composition, thus forming voids in the structure in a molded product composed of the cellulose acetate composition. Then, this allows microorganisms to easily enter the gaps and increases the surface area of the molded article composed of the cellulose acetate composition. As a result, this can contribute to improved biodegradability. Examples of the material include triacetin and diacetin. Triacetin and diacetin also act as plasticizers for the cellulose acetate and thus can contribute to improved thermoformability.

In the cellulose acetate composition, the content of the additive, in terms of the total content, is preferably not greater than 40 wt. %, more preferably not greater than 30 wt. %, and even more preferably not greater than 20 wt. %. In addition, the content of the additive is preferably not less than 5 wt. % and more preferably not less than 10 wt. %.

The content of the basic additive (material with a pH of not lower than 8 in a 1 wt. % aqueous solution at 20° C.) in the cellulose acetate composition is preferably from 1 to 30 wt. %, more preferably from 2 to 20 wt. %, even more preferably from 3 to 15 wt. %, and particularly preferably from 5 to 10 wt. %. An excess amount of the base additive could cause a problem, such as a problem of formability including difficulty in forming the cellulose acetate or the cellulose acetate composition.

The content of the water-soluble additive (material dissolving in water at 20° C. in not less than 2 wt. %) in the cellulose acetate composition is preferably from 5 to 30 wt. %, more preferably from 7.5 to 28 wt. %, and even more preferably from 10 to 25 wt. %. An excess amount of the water-soluble additive would reduce the strength of the cellulose acetate composition.

The content of the material with excellent biodegradability in the sea in the cellulose acetate composition is preferably from 5 to 40 wt. %.

The cellulose acetate composition of the present disclosure can be further used in a mixture with another material to improve biodegradability of the mixture as a whole.

Although the basic material is added to the cellulose acetate or the composition containing the cellulose acetate, in a case where the composition contains, for example, an acidic material, thus undergoes a neutralization reaction when immersed in water, and becomes neutral to acidic, the addition of the basic material may not be effective.

Thus, a slurry of the cellulose acetate composition of the present disclosure formed by mixing with water has preferably a pH of 7 to 13 and preferably a pH of 8 to 12 at 20° C.

The biodegradation of the cellulose acetate of the present disclosure is believed to be that, acetyl groups are eliminated initially, reducing the degree of acetyl substitution, and the resulting compound similar to the cellulose is degraded by the action of microorganisms. Thus, the additive is preferably an additive promoting the degradation of the cellulose acetate.

The cellulose acetate has a cellulose type II crystalline structure (more precisely, referred to as a cellulose acetate type II crystalline structure). Acetylation of a raw material cellulose can convert the cellulose from type I to type II. The cellulose type II crystalline structure has an antiparallel chain structure in which the reducing ends are alternately positioned and is not as rigid as the cellulose type I crystalline structure. Such a crystalline structure of the cellulose acetate also contributes to the excellent biodegradability of the cellulose acetate composition of the present disclosure in seawater. Once the cellulose type I crystalline structure transforms into the cellulose acetate type II crystalline structure, it is believed the structure does not transform back to the type II crystalline structure.

The cellulose acetate composition of the present disclosure has excellent thermoformability and is thus suitable for thermoforming. The form of the molded article formed by molding the cellulose acetate composition of the present disclosure is not particularly limited, and examples include a one-dimensional molded article, such as fibers; a two-dimensional molded article, such as films; and a three-dimensional molded article, such as particles including pellets, tubes, and hollow cylindrical shapes.

When the molded article is in a form of particles, a proportion of particles having a particle diameter of not greater than 2 mm is preferably not greater than 50 wt. %. This is due to excellent biodegradability of such particles.

The proportion (wt. %) of the particles having a particle diameter of not greater than 2 mm can be determined using a sieve specified in JIS Z 8801. That is, the proportion can be determined by attaching a sieve having apertures of 2 mm and a receiving pan to RaTap Machine (available from Sieve Factory Iida Co., Ltd., tapping of 156 times/min, rolling of 290 times/min), oscillating 100 g of a sample for 5 minutes, and then calculating a proportion of the sum of the weight of particles on each sieve relative to the entire weight (100 g of the sample).

The cellulose acetate or the cellulose acetate composition of the present disclosure has excellent biodegradability in seawater and is thus suitable for products often disposed, including straws, containers, such as cups, packaging materials, binders, and tobacco filters; fibers for clothing; nonwoven fabrics; products at least partially flowing with water into the environment during use, such as cosmetic beads and scrubs; and products expected to be flushed into a toilet, such as hygiene materials (diapers, catamenial products).

Method for Producing Cellulose Acetate

A method for producing the cellulose acetate of the present disclosure is not particularly limited, but examples the method include the following method: a production method including (a) producing a cellulose acetate dope by allowing a cellulose and acetic anhydride to react in the presence of an acid catalyst and an acetic acid solvent, (b) hydrolyzing the produced cellulose acetate to make a total degree of acetyl substitution not greater than 2.7, and (c) precipitating the hydrolyzed cellulose acetate with a precipitant.

(a) Producing Cellulose Acetate Dope

In producing the cellulose acetate dope, a cellulose is allowed to react with acetic anhydride in the presence of an acid catalyst and an acetic acid solvent, which is, in other words, an acetylation reaction to acetylate the cellulose. The cellulose has preferably undergone a pretreatment. Examples of the pretreatment include adding acetic acid or an acetic acid containing from 1 to 10 wt. % of sulfuric acid (sulfur-containing acetic acid) to a raw material cellulose in one or two stages to pretreat the raw material cellulose.

As a raw material cellulose (pulp), wood pulp (softwood pulp, hardwood pulp), cotton linters, or the like can be used. These celluloses may be used alone or in combination of two or more; for example, softwood pulp and cotton linters or hardwood pulp may be used in combination.

Cotton linter is described below. Cotton linter has high cellulose purity and little amount of a coloring component and thus provides high transparency to the molded product and is thus preferred.

Next, wood pulp is described below. Wood pulp can be stably supplied as a raw material and is thus more cost effective than linters and preferred. Examples of the wood pulp include hardwood prehydrolysis kraft pulp. In addition, as the wood pulp, ground pulp obtained by grinding hardwood prehydrolysis kraft pulp or the like into a cotton-like form can be used. Grinding can be performed using, for example, a disc refiner.

In addition, the α-cellulose content of the raw material cellulose is preferably not less than 90 wt. %, more preferably not less than 92 wt. %, even more preferably not less than 95 wt. %, and most preferably not less than 97 wt. % to reduce an insoluble residue and not to impair the transparency of the molded product.

A raw material cellulose, such as those supplied in the form of a sheet and thus difficult to handle in subsequent processes, preferably undergoes dry grinding.

In the pretreatment to pretreat the raw material cellulose by adding acetic acid or an acetic acid containing 1 to 10 wt. % of sulfuric acid (sulfur-containing acetic acid) to the raw material cellulose, preferably 10 to 500 parts by weight of acetic acid and/or the sulfur-containing acetic acid can be added in relative to 100 parts by weight of the raw material cellulose. In addition, examples of the method for adding acetic acid and/or the sulfur-containing acetic acid to the cellulose include a method of adding acetic acid or the sulfur-containing acetic acid in one stage or a method of adding acetic acid or the sulfur-containing acetic acid in two or more stages, such as a method of adding acetic acid and then adding the sulfur-containing acetic acid after a duration of certain period of time or a method of adding the sulfur-containing acetic acid and then adding acetic acid after a duration of certain period of time. Examples of specific means of adding include a method of spraying and mixing.

The pretreatment can then be performed, for example, by adding acetic acid and/or the sulfur-containing acetic acid to the cellulose and then allowing the mixture to stand at 17 to 40° C. for 0.2 to 48 hours or sealing and stirring the mixture at 17 to 40° C. for 0.1 to 24 hours.

The process of allowing a cellulose to react with acetic anhydride in the presence of an acid catalyst and an acetic acid solvent to produce the cellulose acetate dope (acetylation reaction) is described below. The acid catalyst is preferably sulfuric acid. In addition, the acetylation can be started, for example, by adding the cellulose to a mixture of acetic acid, acetic anhydride, and sulfuric acid or by adding a mixture of acetic acid and acetic anhydride, and sulfuric acid to the cellulose. Furthermore, the "cellulose acetate dope" here refers to a solution obtained by dissolving the cellulose acetate or a mixture containing the cellulose acetate in a solvent.

In addition, these mixtures are not particularly limited and are any mixtures containing acetic acid and acetic anhydride, but the proportion of acetic acid and acetic anhydride is preferably from 200 to 400 parts by weight of acetic anhydride relative to 300 to 600 parts by weight of acetic acid and more preferably from 240 to 280 parts by weight of acetic anhydride relative to 350 to 530 parts by weight of acetic acid.

For the proportions of the cellulose, the mixture of acetic acid and acetic anhydride, and sulfuric acid in the acetylation reaction, relative to 100 parts by weight of the cellulose, the proportion of the mixture of acetic acid and acetic anhydride is preferably from 500 to 1000 parts by weight, and the proportion of concentrated sulfuric acid is preferably from 0.5 to 15 parts by weight, more preferably from 5 to 14 parts by weight, and even more preferably from 7 to 11 parts by weight. Increasing the amount of concentrated sulfuric acid increases the sulfate component amount.

In the acetylation reaction, the cellulose can be acetylated by stirring the reaction mixture at 20 to 55° C. for 30 minutes to 36 hours from the start of the acetylation.

In addition, the acetylation reaction of the cellulose can be performed, for example, by raising the temperature from 20 to 55° C. over 5 minutes to 36 hours from the start of the acetylation under stirring conditions, or without applying any heat externally to the inside and outside of the reaction system under stirring conditions. During the initial stage of the acetylation reaction, the reaction is in a solid-liquid heterogeneous system, and thus to allow the acetylation reaction to proceed and to reduce unreacted materials while preventing depolymerization reaction, the temperature is preferably raised over as long a time as possible. On the other hand, in terms of productivity, the temperature is raised preferably within 2 hours and more preferably within 1 hour.

In addition, the time required for the acetylation reaction (hereinafter, also referred to as the acetylation time) is desirably from 30 to 200 minutes. Here, the "acetylation time" refers to the time from the time point when the raw material cellulose was charged into the reaction system to start the reaction with acetic anhydride until a neutralizing agent was charged into the reaction system.

(b) Hydrolyzing Cellulose Acetate

In (b) hydrolyzing the produced cellulose acetate to make a total degree of acetyl substitution not greater than 2.7, for example, in hydrolyzing (saponifying), a neutralizing agent containing water (including water vapor); dilute acetic acid; or a carbonate, acetate, hydroxide, or oxide of calcium, magnesium, iron, aluminum, or zinc; or the like is added to stop the acetylation reaction. The dilute acetic acid refers to a 1 to 50 wt. % aqueous solution of acetic acid.

The neutralizing agent is preferably magnesium acetate and calcium acetate. Calcium or the like bonds to sulfuric acid and thus can increase the sulfate ion concentration in the cellulose acetate dope. As a result, the sulfate component amount in the resulting cellulose acetate can be adjusted to greater than 20 ppm and not greater than 400 ppm. In addition, increasing the amount of water added during the hydrolysis allows the ratio ($\tau$) of the degrees of the 2- and 3-position substitutions to the degree of the 6-position substitution to be increased.

The time of the hydrolysis (saponification) reaction (hereinafter, also referred to as aging time) is not particularly limited, and the time is to be appropriately adjusted according to the target total degree of acetyl substitution. Here, the aging time refers to the time from the start of charging the neutralizing agent until the hydrolysis (saponification) reaction is stopped. Increasing the aging time allows the total degree of substitution to be reduced.

In addition, the hydrolysis (saponification) reaction is performed by maintaining the reaction at an aging temperature of preferably 50 to 100° C. and particularly preferably 70 to 90° C. for 20 to 120 minutes. Here, the aging temperature refers to the temperature in the reaction system during the aging time.

(c) Precipitating Hydrolyzed Cellulose Acetate with Precipitant

Precipitating the hydrolyzed cellulose acetate with a precipitant is described below. The precipitant is to be appropriately selected according to the target total degree of acetyl substitution.

The precipitated cellulose acetate may be washed with a precipitant to remove a free metal component, a sulfate component, or the like. In addition, to increase the thermal stability of the cellulose acetate, in addition to washing with a precipitant, an alkali metal compound and/or an alkaline earth metal compound, and in particular a calcium compound, such as calcium hydroxide, may be added as a stabilizer as necessary. Furthermore, a stabilizer may be used during washing with a precipitant.

Optional Process

After (c) precipitating the hydrolyzed cellulose acetate with a precipitant, the resulting cellulose acetate may be separated and dried as necessary. The cellulose acetate is preferably dehydrated by filtration, centrifugation, or the like. In addition, the method of drying is not particularly limited, and a well-known method can be used. For example, drying can be performed under conditions, such as blowing or reduced pressure. Examples of the drying method include hot air drying.

Furthermore, in a case where the cellulose acetate composition of the present disclosure includes an additive, the following method may be used to add the additive in the composition.

The cellulose acetate composition can be obtained by mixing the cellulose acetate and an additive with a solvent, such as acetone, and then removing the solvent. Alternatively, the cellulose acetate composition may be obtained by melting the cellulose acetate and kneading an additive with the melted cellulose acetate.

EXAMPLES

Hereinafter, the present invention will be described specifically with reference to examples, but the technical scope of the present invention is not limited by these examples.

Each physical property of Examples and Comparative Examples described below were evaluated by the following methods.

Degrees of Acetyl Substitution at 2-, 3-, and 6-Position and Total Degree of Acetyl Substitution The degrees of acetyl substitution at the 2-, 3-, and 6-position were each measured according to the method of Tezuka (Tezuka, Carbohydr. Res. 273, 83 (1995)) as described above by propionylating the free hydroxyl group of a cellulose acetate sample with propionic anhydride in pyridine, dissolving the resulting sample in deuterated chloroform ($CDCl_3$), and measuring the $^{13}C$-NMR spectrum. Then, the degrees of acetyl substitution at the 2-, 3-, and 6-positions (DS2, DS3, and DS6) were determined from respective carbon signal of the acetyl group appearing in the region from 169 ppm to 171 ppm in the order of the 2-, 3-, and 6-positions from the high magnetic field. The total degree of acetyl substitution is the sum of the degrees of acetyl substitution at the 2-, 3-, and 6-positions. In addition, the sum of the degree of acetyl substitution at the 2-position and the degree of acetyl substitution at the 3-position (DS2+3) and the ratio τ of the sum of the degree of acetyl substitution at the 2-position and the degree of acetyl substitution at the 3-position to the degree of acetyl substitution at the 6-position were calculated.

Sulfate Component Content

A dried cellulose acetate or cellulose acetate composition was burned in an electric oven at 1300° C., and the sublimated sulfurous acid gas was trapped in a 10% hydrogen peroxide water, titrated with a normal aqueous solution of sodium hydroxide, and the content calculated in terms of $SO_4^{2-}$ was measured as the sulfate component content. The sulfate component amount is expressed in ppm as the amount of sulfate component in 1 g of the cellulose acetate or cellulose acetate composition in the absolute dry state.

Slurry pH

First, 2.0 g of a dried cellulose or cellulose acetate composition in the form of fine powder was accurately weighed, 80 mL of boiled distilled water was added and stirred. The mixture was sealed and allowed to stand for one night, then further stirred, and the sample was precipitated. About 10 mL of the supernatant was taken as the sample liquid, and the pH was measured with a calibrated pH meter. The pH of the boiled distilled water was also measured as a blank, and the proton concentrations $[H^+]_s$ of the sample liquid and $[H^+]_b$ of the blank liquid, where s represents the sample and b represents the blank, each were calculated by the equation $[H^+]=10^{-(pH)}$, where pH represents the measured pH value. When $[H^+]_s > [H^+]_b$, the slurry pH was calculated by the equation below.

$$\text{Slurry pH} = -\text{LOG}([H^+]_s - [H^+]_b)$$

When $[H^+]_s < [H^+]_b$, the hydroxyl group concentrations $[OH^-]_s$ of the sample liquid and $[OH^-]_b$ of the blank liquid each were calculated by the equation $[OH^-]=10^{-14}/[H^+]$, and the slurry pH was calculated by the following equation.

$$\text{Slurry pH} = 14 + \log([OH^-]_s - [OH^-]_b + 10^{-7})$$

Biodegradability

Biodegradability was evaluated using a method for evaluating biodegradability by immersion in seawater. First, a film was produced by a typical solvent casting method. From 10 to 15 parts by weight of a cellulose or cellulose acetate composition obtained in Examples and Comparative Examples were dissolved in 85 to 90 parts by weight of acetone, a predetermined amount of MgO was further added, and a dope was prepared. The dope was allowed to flow on a glass plate and casted with a bar coater. The film was dried at 40° C. for 30 minutes, peeled from the glass plate, dried at 80° C. for another 30 minutes, and a film for evaluation with a thickness of 30-μm was obtained.

The film (10 cm×10 xm×50 μm) produced by the method described above was placed in a stainless steel container and biodegraded by a method in accordance with ASTM D6691. Seawater collected from Hakata Bay in Kitakyushu was used. In addition, biodegradability was evaluated by gravimetry. That is, after 90 days and after 180 days from the start of immersion, the entire content of the stainless steel container was filtered with a filter having apertures of 10 μm, and the film and the residue resulting from the degradation of the film were collected on the filter. The filter was rinsed with 50 mL of distilled water, and then the residue and the filter were dried under vacuum at 80° C. for 4 hours.

The weight increase of the filter before and after filtration of the film residue was designated as W1 (g), the film before immersion was designated as W2 (g), and the weight retention was calculated by the following equation.

$$\text{Weight retention (wt. \%)} = 100 \times W1 / W2$$

Comparative Example 1

A hardwood prehydrolysis kraft pulp with an α-cellulose content of 98.4 wt. % was ground with a disc refiner into a cotton-like form. Onto 100 parts by weight of the ground pulp (water content of 8%), 26.8 parts by weight of acetic acid was sprayed. The mixture was well stirred and then pretreated by allowing the mixture to stand for 60 hours (a pretreatment). The pretreated pulp was added to a mixture of 323 parts by weight of acetic acid, 245 parts by weight of acetic anhydride, and 13.1 parts by weight of sulfuric acid. The temperature was adjusted from 5° C. to a maximum temperature of 40° C. over 40 minutes, and the pretreated pulp was acetylated for 90 minutes. A neutralizing agent (24% aqueous solution of magnesium acetate) was added over 3 minutes, and thus the sulfuric acid amount (sulfuric acid amount for aging) was adjusted to 2.5 parts by weight. Furthermore, the temperature of the reaction bath was raised to 75° C., then water was added, and the water content in the reaction bath (water content for aging) was adjusted to a concentration of 52 mol %. The water concentration for aging was expressed in mol % by multiplying the proportion expressed in molar ratio of the water content in the reaction bath to acetic acid by 100. Then, aging was performed at 85° C. for 130 minutes, magnesium acetate was added to neutralize sulfuric acid to stop the aging, and a reaction mixture containing cellulose acetate was obtained. A dilute aqueous solution of acetic acid was added to the resulting reaction mixture. A cellulose acetate was separated, then washed, dried, and stabilized with calcium hydroxide, and a cellulose acetate was obtained. The evaluation results of each physical property are shown in Table 1.

Comparative Example 2

Cellulose acetate was obtained in the same manner as in Comparative Example 1 with the exception that the aging time was set to 100 minutes. The evaluation results of each physical property are shown in Table 1.

Comparative Example 3

A hardwood prehydrolysis kraft pulp with an α-cellulose content of 98.4 wt. % was ground with a disc refiner into a cotton-like form. For pretreatment, 33 parts by weight of acetic acid maintained at 25° C. was sprayed onto 100 parts by weight of the ground pulp (water content of 7.0%). The mixture was well stirred and then pretreated by allowing it to stand for 2 hours. For esterification, the pretreated pulp by the pretreatment was added to a mixed solution of 364 parts by weight of acetic acid, 244 parts by weight of acetic anhydride, and 6.6 parts by weight of concentrated sulfuric acid. The mixed solution was cooled to −8.9° C. in advance. Based on the time point when the pulp was added to the mixed solution, the temperature was adjusted from −8.9° C. to a peak temperature of 50.9° C. over 48 minutes, and the temperature was lowered by 5° C. after 65 minutes. After 152 minutes from the time when the pulp was added to the mixed solution, addition of a neutralizing agent (24 wt. % magnesium acetate) was started. The neutralizing agent was added, thus the sulfuric acid amount (sulfuric acid amount for aging) was adjusted to 3.7 parts by weight, and the esterification was completed. Furthermore, for hydrolyzing, the temperature of the reaction bath was raised to 50.9° C., and hydrolysis was performed for 50 minutes. Magnesium acetate was added to neutralize sulfuric acid to stop the hydrolysis reaction and a reaction mixture containing cellulose acetate was obtained. The time from when the pulp was added to the mixed solution until the neutralizing agent was added is referred to as the esterification time. To 100 parts by weight of the reaction mixture containing cellulose acetate, about 300 parts by weight of 10% dilute acetic acid aqueous solution was added for precipitation. After washing with water, calcium hydroxide was added as a stabilizer, the precipitate was separated by filtration and dried, and cellulose acetate was obtained. The evaluation results of each physical property are shown in Table 1.

Comparative Example 4

A cotton linter with an α-cellulose content of 98.4 wt. % and a carboxyl group content of 0.8 meq/100 g was used. For pretreatment, 43 acetic acid maintained at 25° C. was sprayed onto 100 parts by weight of the ground pulp (water content of 7.0%). The mixture was well stirred and then pretreated by allowing to stand for 2 hours. For esterification, the pretreated pulp by the pretreatment was added to a mixed solution of 386 parts by weight of acetic acid, 279 parts by weight of acetic anhydride, and 9.9 parts by weight of concentrated sulfuric acid. The mixed solution was cooled to −12.7° C. in advance. Based on the time point when the pulp was added to the mixed solution, the temperature was adjusted from −8.9° C. to a peak temperature of 38° C. over 62 minutes. After 126 minutes from the time when the pulp was added to the mixed solution, addition of a neutralizing agent (24 wt. % magnesium acetate) was started. The neutralizing agent was added, thus the sulfuric acid amount (sulfuric acid amount for aging) was adjusted to 3.7 parts by weight, and the esterification was completed. Furthermore, for hydrolyzing, the temperature of the reaction bath was raised to 50.9° C., and hydrolysis was performed for 50 minutes. Magnesium acetate was added to neutralize sulfuric acid to stop the hydrolysis reaction and a reaction mixture containing cellulose acetate was obtained. The time from when the pulp was added to the mixed solution until the neutralizing agent was added is referred to as the esterification time. To 100 parts by weight of the reaction mixture containing cellulose acetate, about 300 parts by weight of 10% dilute acetic acid aqueous solution was added for precipitation. After washing with water, calcium hydroxide was added as a stabilizer, the precipitate was separated by filtration and dried, and cellulose acetate was obtained. The evaluation results of each physical property are shown in Table 1.

Comparative Example 5

A sheet-form cellulose (cotton linter pulp) with an α-cellulose content of 97 wt. % was processed with a disc refiner into a cotton-like form. Acetic acid was sprayed in a proportion indicated for the 100 parts by weight of the cotton-like cellulose (water content of 8.0 wt. %). The mixture was well stirred and allowed to stand at a temperature of 24° C. for 60 minutes (a first pretreatment). Furthermore, 30.24 parts of acetic acid containing 0.94 parts of sulfuric acid was added to the cellulose having undergone the first pretreatment, and the mixture was allowed to stand at 24° C. for 45 minutes (a second pretreatment). Then, 417.85 parts of acetic acid, 282.98 parts of acetic anhydride, and 8.72 parts of sulfuric acid were mixed to the pretreated cellulose having undergone the second pretreatment. The mixture was maintained at not higher than 15° C. for 20 minutes, then the temperature of the reaction system was raised to 35° C. at a rate of temperature increase of 0.31° C./min and then maintained for 80 minutes, and the cellulose was acetylated. Then, 0.15 parts by weight of acetic acid, 22.98 parts by weight of water, and 7.30 parts by weight of magnesium acetate were mixed and maintained at a temperature of 61° C. for 95 minutes, and then 7.48 parts by weight of magnesium acetate, 20.94 parts by weight of acetic acid, and 21.44 parts of water were added and the aging reaction was stopped. The reacted materials was charged into a dilute acetic acid under stirring, and the product was precipitated and immersed in a dilute aqueous solution of calcium hydroxide, and then separated by filtration and dried, and cellulose acetate was obtained.

Examples 1 to 8 and Comparative Examples 6 to 11

A sheet-form cellulose (hardwood pulp) was processed with a disc refiner into a cotton-like form. Onto 100 parts by weight of the cotton-like cellulose (water content of 8.0 wt. %), 32.71 parts by weight of acetic acid was sprayed. The mixture was well stirred and allowed to stand at a temperature of 24° C. for 60 minutes (a pretreatment). To the pretreated cellulose, 358.51 parts by weight of acetic acid, 214.99 parts by weight of acetic anhydride, and A parts by weight of sulfuric acid were mixed. The mixture was maintained at 15° C. for 20 minutes, then the temperature of the reaction system was raised to 45° C. at a rate of temperature increase of 0.31° C./min and then maintained for 70 minutes, and the cellulose was acetylated, and cellulose triacetate was produced. Then, 0.28 parts by weight of acetic acid, 89.55 parts by weight of water, and 13.60 parts by weight of magnesium acetate were added, and the acetylation reaction was stopped. The sulfuric acid amount A was appropriately adjusted in a range of 0.1 to 15 parts by weight, and the sulfuric acid amount of the cellulose acetate to be synthesized was adjusted. To the resulting reaction mixture, 0.06 parts by weight of acetic acid, B parts by weight of water, and 2.90 parts by weight of magnesium acetate were added, and an aging reaction was performed at 85° C. for C minutes. The water B to be added to the aging reaction was adjusted in a range of 1 to 50 parts by weight, and the degrees of substitutions at the 2-, 3-, and 6-positions were adjusted. The aging reaction time C was adjusted in a range of 5 to 120 minutes, and the degree of substitution of the cellulose acetate to be synthesized was adjusted. Cellulose acetate was thus obtained. The evaluation results of each physical property are shown in Table 1.

Example 9

After 9.5 parts by weight of the cellulose acetate with a degree of substitution of 2.46 synthesized in Example 1 was heated at 110° C. for 2 hours and dried, the cellulose acetate was added to 90 parts by weight of acetone, stirred at 25° C. for 6 hours, and dissolved. To this mixed solution, 0.5 parts by weight of a powder of magnesium aluminometasilicate, which is a basic additive, was added as an additive. The mixture was further stirred at 25° C. for 6 hours, and a dope for film production was prepared. This dope was allowed to flow on a glass plate and casted with a bar coater, and dried at 40° C. for 30 minutes. Then, the film was peeled off from the glass plate, dried at 80° C. for another 30 minutes, and a cellulose acetate composition film with a thickness of 30 μm was obtained. The evaluation results of each physical property are shown in Table 1.

Example 10

A cellulose acetate composition film with a thickness of 30 μm was obtained in the same manner as in Example 9 with the exception that magnesium oxide was used as the basic additive, the amount of the cellulose acetate was 9.6 parts by weight, and the additive was 0.4 parts by weight. The evaluation results of each physical property are shown in Table 1.

Example 11

A cellulose acetate composition film with a thickness of 30 μm was obtained in the same manner as in Example 9 with the exception that 2.5 parts by weight of triacetin as a water-soluble additive instead of the basic additive and 7.5 parts by weight of the cellulose acetate were used.

The evaluation results of each physical property are shown in Table 1.

Example 12

A cellulose acetate composition film with a thickness of 30 μm was obtained in the same manner as in Example 9 with the exception that 0.5 parts by weight of magnesium oxide, which is a basic additive, 2.0 parts by weight of triacetin, which is a water-soluble additive, and 7.5 parts by weight of the cellulose acetate were used. The evaluation results of each physical property are shown in Table 1.

Example 13

As an additive, 0.8 parts by weight of PHBH as an additive, which is a material with excellent biodegradability in the sea, and 9.2 parts by weight of the cellulose acetate were used, melt-kneaded at 240° C. using a twin-screw kneader, and a cellulose acetate composition film with a thickness of about 30 μm was obtained with a T-die mold of Labo Plastomill. The evaluation results of each physical property are shown in Table 1.

TABLE 1

| | Total degree of acetyl substitution | DS6 | DS2 + 3 | Sulfuric acid content (ppm) | τ | Additive Type | Content (wt. %) | Slurry pH | Biodegradability Weight retention (wt. %) Day 0 | Day 90 | Day 180 |
|---|---|---|---|---|---|---|---|---|---|---|---|
| Example 1 | 2.46 | 0.74 | 1.72 | 30 | 2.32 | — | — | 5.8 | 100 | 55 | 0 |
| Example 2 | 2.48 | 0.79 | 1.69 | 50 | 2.13 | — | — | 5.8 | 100 | 54 | 0 |
| Example 3 | 2.46 | 0.74 | 1.72 | 140 | 2.32 | — | — | 5.6 | 100 | 57 | 0 |
| Example 4 | 2.45 | 0.73 | 1.72 | 180 | 2.35 | — | — | 5.7 | 100 | 56 | 0 |
| Example 5 | 2.45 | 0.73 | 1.72 | 350 | 2.35 | — | — | 5.5 | 100 | 55 | 0 |
| Example 6 | 2.44 | 0.75 | 1.69 | 200 | 2.25 | — | — | 5.6 | 100 | 47 | 0 |
| Example 7 | 2.42 | 0.78 | 1.64 | 380 | 2.10 | — | — | 5.5 | 100 | 48 | 0 |
| Example 8 | 2.20 | 0.67 | 1.53 | 150 | 2.28 | — | — | 5.4 | 100 | 40 | 0 |
| Example 9 | 2.46 | 0.74 | 1.72 | 140 | 2.32 | Mg aluminometasilicate | 5 | 8.5 | 100 | 35 | 0 |
| Example 10 | 2.46 | 0.74 | 1.72 | 140 | 2.32 | MgO | 4 | 9.5 | 100 | 30 | 0 |
| Example 11 | 2.46 | 0.74 | 1.72 | 140 | 2.32 | Triacetin | 25 | 5.6 | 100 | 35 | 0 |
| Example 12 | 2.46 | 0.74 | 1.72 | 140 | 2.32 | MgO + triacetin | MgO 5 Triacetin 20 | 10 | 100 | 27 | 0 |
| Example 13 | 2.46 | 0.74 | 1.72 | 140 | 2.32 | PHBH | 8 | 5.8 | 100 | 40 | 0 |
| Comparative Example 1 | 2.26 | 0.69 | 1.57 | 10 | 2.28 | — | — | 5.4 | 100 | 59 | 10 |
| Comparative Example 2 | 2.44 | 0.75 | 1.69 | 20 | 2.25 | — | — | 5.8 | 100 | 72 | 33 |

TABLE 1-continued

|  | Total degree of acetyl substitution | DS6 | DS2 + 3 | Sulfuric acid content (ppm) | τ | Additive Type | Additive Content (wt. %) | Slurry pH | Biodegradability Weight retention (wt. %) Day 0 | Day 90 | Day 180 |
|---|---|---|---|---|---|---|---|---|---|---|---|
| Comparative Example 3 | 2.93 | 0.95 | 1.99 | 135 | 2.10 | — | — | 5.4 | 100 | 95 | 90 |
| Comparative Example 4 | 2.88 | 0.90 | 1.98 | 73 | 2.19 | — | — | 5.5 | 100 | 95 | 90 |
| Comparative Example 5 | 2.81 | 0.90 | 1.91 | 200 | 2.12 | — | — | 5.5 | 100 | 95 | 90 |
| Comparative Example 6 | 2.50 | 0.85 | 1.65 | 350 | 1.94 | — | — | 5.5 | 100 | 70 | 33 |
| Comparative Example 7 | 2.50 | 0.85 | 1.65 | 220 | 1.94 | — | — | 5.5 | 100 | 70 | 34 |
| Comparative Example 8 | 2.44 | 0.80 | 1.64 | 6 | 2.05 | — | — | 5.7 | 100 | 70 | 32 |
| Comparative Example 9 | 2.50 | 0.84 | 1.66 | 380 | 1.98 | — | — | 5.6 | 100 | 70 | 32 |
| Comparative Example 10 | 2.50 | 0.85 | 1.65 | 150 | 1.94 | — | — | 5.5 | 100 | 70 | 33 |
| Comparative Example 11 | 2.50 | 0.85 | 1.65 | 80 | 1.94 | — | — | 5.4 | 100 | 70 | 31 |

As shown in Table 1, all the cellulose acetate compositions of Comparative Examples having a high total degree of acetyl substitution, a low ratio τ of the sum of the degree of acetyl substitution at the 2-position and the degree of acetyl substitution at the 3-position to the degree of acetyl substitution at the 6-position, or a low sulfate component amount have poor biodegradability. On the other hand, the cellulose acetate compositions of Examples have excellent biodegradability in seawater.

The invention claimed is:

1. A cellulose acetate composition containing a cellulose acetate and an additive; wherein
    the cellulose acetate has a total degree of acetyl substitution of not greater than 2.7 and a ratio τ of a sum of a degree of acetyl substitution at a 2-position and a degree of acetyl substitution at a 3-position to a degree of acetyl substitution at a 6-position in the total degree of acetyl substitution of not less than 2.0; and
    the additive is one or more selected from magnesium aluminometasilicate, magnesium oxide, triacetin, or poly[hydroxybutyrate-co-hydroxyhexanoate];
    wherein a content of the additive is 5 to 40 wt. %.

2. The cellulose acetate composition according to claim 1, wherein a content of a sulfate component in the cellulose acetate is greater than 20 ppm and not greater than 400 ppm.

3. The cellulose acetate composition according to claim 1, wherein a slurry formed by mixing the cellulose acetate composition with water has a pH of 7 to 13 at 20° C.

4. The cellulose acetate composition according to claim 1, wherein the cellulose acetate has a total degree of acetyl substitution of 1.8 to 2.7.

5. The cellulose acetate composition according to claim 1, wherein the cellulose acetate has a total degree of acetyl substitution of 2.20 to 2.7.

* * * * *